United States Patent [19]

Delgado et al.

[11] Patent Number: 4,994,322

[45] Date of Patent: Feb. 19, 1991

[54] PRESSURE-SENSITIVE ADHESIVE COMPRISING HOLLOW TACKY MICROSPHERES AND MACROMONOMER-CONTAINING BINDER COPOLYMER

[75] Inventors: Joaquin Delgado; Roger W. Leinen; Spencer F. Silver, all of St. Paul, Minn.

[73] Assignee: Minnesota Mining and Manufacturing, St. Paul, Minn.

[21] Appl. No.: 407,092

[22] Filed: Sep. 18, 1989

[51] Int. Cl.[5] .......................... C08J 9/236; C08J 9/32
[52] U.S. Cl. .................................... 428/343; 428/355; 428/402; 521/54; 521/56; 521/63; 521/64; 521/134; 521/60; 523/223; 524/801; 525/205; 525/218; 525/221; 525/228
[58] Field of Search .................. 428/343, 355, 402; 521/54, 56, 60, 63, 64, 134; 523/223; 524/801; 525/205

[56] References Cited

U.S. PATENT DOCUMENTS

| | | | |
|---|---|---|---|
| 3,400,095 | 9/1968 | Kremer et al. | 260/32.8 |
| 3,578,622 | 5/1971 | Brown et al. | 260/33.8 |
| 3,691,140 | 9/1972 | Silver | 260/78.5 |
| 3,786,116 | 1/1974 | Milkovich et al. | 260/885 |
| 3,842,059 | 10/1974 | Milkovich et al. | 260/93.5 |
| 3,857,731 | 12/1974 | Merrill, Jr. et al. | 117/122 |
| 4,049,483 | 9/1977 | Loder et al. | 156/230 |
| 4,166,152 | 8/1979 | Baker et al. | 428/522 |
| 4,495,318 | 1/1985 | Howard | 524/375 |
| 4,554,324 | 11/1985 | Husman et al. | 525/301 |
| 4,598,112 | 7/1986 | Howard | 524/78 |
| 4,656,218 | 4/1987 | Kinoshita | 524/460 |
| 4,735,837 | 4/1988 | Miyasaka et al. | 428/40 |
| 4,786,696 | 11/1988 | Bohnel | 625/88 |
| 4,810,763 | 3/1989 | Mallya et al. | 526/203 |
| 4,968,562 | 11/1990 | Delgado | 521/56 |

FOREIGN PATENT DOCUMENTS 0209337 7/1985 European Pat. Off. .
3544992A1 12/1985 Fed. Rep. of Germany .

OTHER PUBLICATIONS

*Surfactant Systems: Their Chemistry, Pharmacy, & Biology*, (D. Attwood and A. T. Florence, Chapman & Hall Ltd., New York, N.Y., 1983).
S. L. Rosen, *Fundamental Principles of Polymer Materials*, p. 259, Wiley–Interscience, 1982.
D. Satas, *Handbook of PSA Technology*, 2nd Ed., p. 909, Van–Norstrand–Rheinhold, N.Y., 1989.

Primary Examiner—Morton Foelak
Attorney, Agent, or Firm—D. M. Sell; D. P. Neaveill

[57] ABSTRACT

A repositionable pressure-sensitive adhesive comprising from about 70% to about 99% hollow, polymeric, acrylate, inherently tacky, infusible, solvent-insoluble, solvent-dispersible, elastomeric microspheres comprising at least one alkyl acrylate or alkyl methacrylate ester, a majority of the microspheres having one or more interior voids having a diameter of at least about 10% of the diameter of the microsphere, and correspondingly, from about 30% to about 1% of a binder copolymer comprising an elastomeric polymeric backbone having pendant therefrom high Tg polymeric moieties.

16 Claims, No Drawings

PRESSURE-SENSITIVE ADHESIVE COMPRISING HOLLOW TACKY MICROSPHERES AND MACROMONOMER-CONTAINING BINDER COPOLYMER

BACKGROUND OF THE INVENTION

1. Field of the Invention

This invention relates to a composition containing a dispersion of hollow polymeric, acrylate, infusible, inherently tacky, elastomeric, solventdispersible, solvent-insoluble microspheres and a soluble macromonomer-containing copolymer, and to their use as sprayable repositionable pressure-sensitive adhesives.

2. Description of the Related Art

Solid, inherently tacky, elastomeric microspheres are known in the art to be useful in repositionable pressure-sensitive adhesive applications. As used herein, the term "repositionable" refers to the ability to be repeatedly adhered to and removed from a substrate without substantial loss of adhesion capability. Microsphere-based adhesives are thought to perform well in such applications at least in part due to their "self-cleaning" nature, wherein substrate contaminants tend to be pushed aside and trapped between the microspheres as the adhesive is applied. Upon removal, the adhesive then still presents a relatively uncontaminated surface for reapplication to the substrate.

Such spheres and their use in aerosol adhesive systems having repositionable properties are disclosed in U.S. Pat. No. 3,691,140 (Silver). These microspheres are prepared by aqueous suspension polymerization of alkyl acrylate monomers and ionic comonomers, e.g., sodium methacrylate, in the presence of an emulsifier, preferably an anionic emulsifier. The use of a water-soluble, substantially oil-insoluble ionic comonomer is critical to preventing coagulation or agglomeration of the microspheres.

U.S. Pat. No. 4,166,152, (Baker et al.) describes solid, inherently tacky (meth)acrylate microspheres which are prepared from non-ionic alkyl acrylate or methacrylate monomer(s) in the presence of both an emulsifier and an ionic suspension stabilizer having an interfacial tension sufficient to prevent microsphere agglomeration. Such microspheres are also disclosed in U.S. Pat. Nos. 4,495,318 and 4,598,112 (Howard), where the preparative methods involve the use of a nonionic emulsifier or a cationic emulsifier. All three patents disclose utility as a "reusable adhesive".

U.S. Pat. No. 4,786,696, (Bohnel) describes a suspension polymerization process for preparing solid, inherently tacky (meth)acrylate microspheres which does not require the use of either an ionic comonomer or an ionic suspension stabilizer in order to prevent agglomeration. Rather, the process requires agitation of the vessel charge prior to the initiation of the reaction sufficient to create a suspension of monomer droplets having an average monomer droplet size of between about 5 and about 70 micrometers. In addition to (meth)acrylate monomer, a minor portion of a non-ionic, vinylic comonomer such as, e.g., acrylic acid may be included to modify the "tacky nature" of the microspheres.

The primary problem associated with these types of adhesives have been microsphere loss, i.e., microsphere transfer to the substrate. The problem is exacerbated when the microspheres are used in aerosol form. This has typically been addressed by the use of a binder or primer for the microspheres.

U.S. Pat. No. 3,857,731, (Merrill et al.) and EPA 0209337, Thomson et al. both address microsphere transfer problems. The former discloses sheets coated with tacky elastomeric copolymer microspheres and a binder material which provides sockets in which the microspheres are held by predominately mechanical forces. Additional chemical forces are not required; in fact, it is further stated at column 1, at line 62 that the binder "need not have a high degree of adhesion for the microspheres, and in fact, binders having an extremely low adhesion for the microspheres provide an excellent microsphere retaining surface". A wide range of useful binders are disclosed including hard resins such as an epoxy or nitrocellulose composition, soft resins such as an acrylate or vinyl ether, urethanes, fluorochemicals, silicones and microcrystalline waxes. Preferably, the binder is used at a level of 0.20 to 0.60 parts of binder to 1 part microspheres. Adhesives are disclosed to have a maximum adhesion of 25.9 g/cm.

EPA 0209337, (Thomson et al.) discloses microsphere adhesives which may contain an adhesion promoting monomer, such as a vinyl pyridine, having functionality which remains unreacted during polymerization, and is therefore available for subsequent binding of the microspheres through electrostatic interaction or chemical bonding to a substrate, which may be primed. It is disclosed that a binder may be blended with the microspheres.

DE 3,544,882 A1, (Nichiban), describes crosslinked microspheres composed of (meth)acrylate ester and vinyl type monomer, e.g., acrylic acid, having a reactive functional group through which crosslinking is achieved. When tacky, the spheres are said to be useful in spray or coated sheet form as "removable adhesive". The microspheres may contain other monomers to prevent partial transfer of the adhesive when the backing is pulled away from the substrate. Monomers disclosed as useful include vinyl acetate, styrene, and acrylonitrile. The additional monomers may be present in amounts up to 50 percent of the (meth)acrylate ester monomer.

U.S. Pat. No. 4,735,837, (Miyasaka et al.) discloses a detachable adhesive sheet having an adhesive layer containing "elastic micro-balls" with the ratio of adhesive to micro-balls being from about 1:10 to about 10:1. The density of the micro-balls for an optimal balance of adhesive and removability is disclosed to be from 1,000 to 150,000 pieces per square centimeter. The micro-balls may or may not be tacky. They can be derived from, e.g., (meth)acrylate monomer and an α-olefinic carboxylic acid monomer via suspension polymerization in an aqueous medium. However, no details as to the nature of the surfactants utilized, etc., are disclosed. The micro-balls and an adhesive are dispersed in solvent, mixed, and coated, with the ratio of adhesive to micro-balls being from about 1:10 to about 10:1. This ratio is disclosed to be critical in order that all micro-balls in the final product, including those protruding from the surface, are completely covered with the adhesive.

U.S. Pat. No. 4,810,763 (Mallya et al.) discloses inherently tacky infusible pressure-sensitive adhesive microspheres. It is stated that the microspheres must have a adhesion of 57-92 N/m (59-95 g/cm) to stainless steel at a peel rate of 300 inches/minute, after 20 minutes dwell, when adhered with a 4.5 pound roller, to provide good performance.

U.S. Pat. No. 4,656,218, (Kinoshita) discloses a releasable sheet coated with a microsphere adhesive prepared by suspension polymerization followed by emulsion polymerization wherein a latex binder is formed in situ from alpha-olefin carboxylic acids such as acrylic acid. The latex is disclosed to consist of microparticles having average diameter of from 1-4 microns. The binder is stated to have no effect on the properties of the adhesive, and to be effective in improving the anchorage of the microspheres to the substrate. Tackifiers are disclosed as preferred optional ingredients.

U.S. Pat. No. 4,049,483, (Loder et al.) blends pressure-sensitive adhesive microspheres with hot-melt adhesives to impart temporary pressure-sensitive bonding ability to a hot-melt film. A typical composition, containing about 27% tackified microspheres had adhesion of about 14 g/inch. Other compositions exhibited adhesion of from 14 g/inch up to a high of about 24 g/inch (5.5 -9.4g/cm).

In an aerosol adhesive, the sprayability of the adhesive is critical. Several patents disclose nonparticulate adhesives having good sprayability. U.S. Pat. No. 3,578,622, (Brown et al.), discloses an acrylate aerosol spray adhesive which is non-cobwebbing, and does not form rubbery strings. The aerosol composition contains at least 2% of a pressure-sensitive crosslinked, elastomeric, acrylate polymer having an insolubility index of from about 0.5 and 0.97, and a carrier liquid. Acrylic acid esters are disclosed as preferred acrylate polymers. The use of a tackifier is also disclosed.

Another aerosol adhesive is disclosed in U.S. Pat. No. 3,400,095, (Kremer et al.) wherein the aerosol comprises a crosslinked, insoluble, dispersed rubber polymer containing a tackifier resin, from 0.3 to 3% of a soluble elastomer, and an organic liquid. The use of the soluble elastomer is disclosed to control the sprayability, providing a one inch spray width without excess misting or cobwebbing.

U.S. Pat. No. 4,554,324, (Husman et al.) discloses a pressure-sensitive adhesive comprising a polymer having an inherent viscosity greater than 0.2 and having in its backbone at least a major portion by weight of polymerized monomeric acrylic or methacrylic acid ester of a non-tertiary alcohol, and having attached to the backbone polymeric moieties having a weight average molecular weight of above 2000 and a $T_g$ of 20° C or higher.

It has now been discovered that a particulate, i.e., microsphere adhesive with excellent sprayability, improved peel adhesion and low adhesive transfer can be made by combining hollow, polymeric, acrylate, inherently tacky elastomeric microspheres with a binder copolymer containing a macromolecular monomer.

SUMMARY OF THE INVENTION

This invention provides pressure-sensitive adhesives comprising hollow, polymeric, acrylate, inherently tacky, infusible, solvent-insoluble, solvent-dispersible, elastomeric microspheres, and at least about 1% of a macromolecular-monomer containing (macromonomer-containing) elastomeric binder copolymer.

Preferred hollow microspheres for use in the pressure-sensitive adhesives contain one or more interior voids having diameters at least about 10% of the diameter of the microsphere.

The invention further provides organic dispersions of the microspheres and binder copolymers, spray repositionable pressure-sensitive adhesive compositions, and sheet materials coated therewith.

More specifically, the pressure-sensitive adhesive comprises from about 70% to about 99% of (a) hollow, polymeric, acrylate, inherently tacky, infusible, solvent-insoluble, solvent-dispersible, elastomeric microspheres comprising at least one alkyl acrylate or alkyl methacrylate ester, a majority of the microspheres having one or more interior voids having a diameter of at least about 10% of the diameter of the microsphere, and (b) correspondingly, from about 30% to about 1% of a binder copolymer comprising an elastomeric polymeric backbone having pendant therefrom polymeric moieties, such backbone containing repeating A and C monomers, and from about 1% to about 20% B monomers, wherein A is a monomeric acrylic or methacrylic acid ester of a non-tertiary alcohol, said alcohol having from 1 to 14 carbon atoms, with the average number of carbon atoms being about 4-12, said A monomer comprising from about 50% to about 98% of said monomers;

B is a polar monomer copolymerizable with said monomeric acrylic acid ester;

C is a monomer having the general formula X-(Y)$_n$-Z, wherein X is a vinyl group copolymerizable with said A and B monomers;

Y is a divalent linking group, where n is zero or 1, and

Z is a monovalent polymeric moiety having a $T_g$ greater than 20° C, and a molecular weight in the range of about 2,000 to about 30,000, and being essentially unreactive under copolymerization conditions, C comprising from about 1% to about 30% of said monomers, wherein said binder copolymer has a shear storage modulus of at least about $1 \times 10^5$ Pascals at 22° C Preferably, the pressure-sensitive adhesive comprises from about 70% to about 99% of (a) hollow, polymeric, acrylate, inherently tacky, infusible, solvent-insoluble, solvent-dispersible, elastomeric microspheres comprising (i) at least about 85 parts by weight of at least one alkyl acrylate or alkyl methacrylate ester; and (ii) up to about 15 parts by weight of at least one polar monomer, a majority of the microspheres having one or more interior voids having a diameter of at least about 30% of the diameter of the microsphere, and (b) correspondingly, from about 30% to about 1% of a binder copolymer comprising an elastomeric polymeric backbone having pendant therefrom polymeric moieties, such backbone containing repeating A and C monomers and from about 1% to about 20% B monomers, wherein A is a monomeric acrylic or methacrylic acid ester of a non-tertiary alcohol, said alcohol having from 1 to 14 carbon atoms, with the average number of carbon atoms being about 4-12, said A monomer comprising from about 50% to about 98% of said monomers;

B is a polar monomer copolymerizable with said acrylic acid ester;

C is a monomer having the general formula X-(Y)$_n$-Z, wherein X is a vinyl group copolymerizable with said A and B monomers, Y is a divalent linking group, where n is zero or 1, and Z is a monovalent polymeric moiety having a $T_g$ greater than 20° C, and a molecular weight in the range of about 2,000 to about 30,000, and being essentially unreactive under copolymerization conditions, C comprising from about 1% to about 30% of said monomers, wherein said binder copolymer has a shear storage modulus of at least about $1.0 \times 10^5$ Pascals at 22° C.

The following terms have these meanings as used herein:

1. The term "droplet" means the liquid stage of the microspheres prior to the completion of polymerization.

2. The term "cavity" means a space within the walls of a droplet or microsphere when still in the suspension or dispersion medium prior to drying, and thus containing whatever medium was used.

3. The term "void" means an empty space completely within the walls of a polymerized microsphere.

4. The term "hollow" means containing at least one void or cavity.

5. A "macromonomer" means a macromolecular monomer as disclosed in U.S. Pat. No. 3,786,111.

6. The terms "macromonomer-containing binder copolymer", "binder copolymer", "elastomeric binder copolymer", and the like are used interchangeably to refer to macromolecular monomer-containing elastomeric binder copolymers.

All weights, parts, and ratios herein are by weight unless specifically stated otherwise.

DETAILED DESCRIPTION OF THE INVENTION

The pressure-sensitive adhesives of the invention comprise from about 70% to about 99% hollow microspheres, and correspondingly from about 30% to about 1% of a solvent-soluble, macromonomer-containing binder copolymer.

The hollow microspheres comprise at least one alkyl acrylate or alkyl methacrylate ester and one or more polar monomers. Preferably, at least one polar monomer is included in the composition, but hollow microspheres may also be prepared using acrylate or methacrylate monomer(s) alone or in combination only with other vinyl monomers, e.g., vinyl acetate. However, when methacrylate monomer alone is utilized, a crosslinking agent, infra, must be included. For most polar monomers, incorporation of from about 1 part to about 10 parts by weight is preferred, as this ratio provides hollow microspheres with balanced pressure-sensitive adhesive properties.

Alkyl acrylate or methacrylate monomers useful in preparing the hollow microspheres for pressure-sensitive adhesives of this invention are those monofunctional unsaturated acrylate or methacrylate esters of non-tertiary alkyl alcohols, the alkyl groups of which have from 4 to about 14 carbon atoms. Such acrylates are oleophilic, water emulsifiable, have restricted water solubility, and as homopolymers, generally have glass transition temperatures below about −20° C. Included within this class of monomers are, for example, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures.

Preferred acrylates include isooctyl acrylate, isononyl acrylate, isoamyl acrylate, isodecyl acrylate, 2-ethylhexyl acrylate, n-butyl acrylate, sec-butyl acrylate, and mixtures thereof. Acrylate or methacrylate or other vinyl monomers which, as homopolymers, have glass transition temperatures higher than about −20° C, e.g., tert-butyl acrylate, isobornyl acrylate, butyl methacrylate, vinyl acetate, N-vinyl pyrrolidone, acrylamide, and the like, may be utilized in conjunction with one or more of the acrylate or methacrylate monomers provided that the glass transition temperature of the resultant polymer is below about −20° C.

Polar monomers suitable for copolymerization with the acrylate or methacrylate monomers are those polar monomers which are both somewhat oil-soluble and watersoluble.

Representative examples of suitable polar monomers include weakly to moderately ionized polar monomers such as acrylic acid, methacrylic acid, itaconic acid, crotonic acid, maleic acid, fumaric acid, sulfoethyl methacrylate, and ionic monomers such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(β-methacryloxyethyl) ammonium propionate betaine, trimethylamine methacrylimide, 1,1-dimethyl-1-(2,3-dihydroxypropyl)amine methacrylimide, and the like. Preferred polar monomers are mono-olefinic, mono- and dicarboxylic acids, salts thereof, and mixtures thereof.

Preferred microspheres of the invention comprise at least about 85 parts of the alkyl acrylate monomer(s), and correspondingly up to about 15 parts of the polar monomer(s).

Aqueous suspensions of the hollow microspheres may be prepared by a "two-step" emulsification process which first involves forming a water-in-oil emulsion of an aqueous solution of polar monomers in oil phase monomer, i.e., at least one acrylate or methacrylate ester, using an emulsifier having a low hydrophilic-lipophilic balance (HLB) value. Where it is desirable not to include a polar monomer, water may be mixed directly with the oil phase monomer, i.e., acrylate or methacrylate ester, and emulsifier to form the water-in-oil emulsion. Suitable emulsifiers are those having an HLB value below about 7, preferably in the range of about 2 to about 7. Examples of such emulsifiers include sorbitan mono-oleate, sorbitan trioleate, and ethoxylated oleyl alcohol such as Brij ™ 93, available from Atlas Chemical Industries, Inc. Thus, in this first step, oil phase monomer(s), emulsifier, a free radical initiator, and, optionally, a crosslinking monomer or monomers as defined below are combined, and an aqueous solution of all or a portion of the polar monomer(s) is agitated and poured into the oil phase mixture to form a water-in-oil emulsion. A thickening agent, e.g., methyl cellulose may also be included in the aqueous phase of the water-in-oil emulsion. In the second step, a water-in-oil-in-water emulsion is formed by dispersing the water-in-oil emulsion of the first step into an aqueous phase containing an emulsifier having an HLB value above about 6. The aqueous phase may also contain any portion of the polar monomer(s) which was not added in step one. Examples of such emulsifiers include ethoxylated sorbitan mono-oleate, ethoxylated lauryl alcohol, and alkyl sulfates. In both steps, when an emulsifier is utilized, its concentration should be greater than its critical micelle concentration, which is herein defined as the minimum concentration of emulsifier necessary for the formation of micelles, i.e., submicroscopic aggregations of emulsifier molecules. Critical micelle concentration is slightly different for each emulsifier, usable concentrations ranging from about $1.0 \times 10^{-4}$ to about 3.0 moles/liter. Additional detail concerning the preparation of water-in-oil-in-water emulsions, i.e., multiple emulsions, may be found in various literature references, e.g., *Surfactant Systems: Their Chemistry, Pharmacy, & Biology*, (D. Attwood and A. T. Florence, Chapman & Hall Limited, New York, New York, 1983). The final process step of this method of the invention involves the application of heat or radiation to initiate polymerization of the monomers. Suitable initiators are those which are normally suitable for free radical polymerization of acrylate monomers and which are oil-soluble and of very low solubility in water. Examples of such initiators include thermally-activated initiators such as azo compounds, hydroperoxides, peroxides, and the like, and photoinitiators such as benzophenone, benzoin ethyl ether, and 2,2-dimethoxy-2-phenyl acetophenone. Use of a water-soluble polymerization initiator causes formation of substantial amounts of latex. The extremely small particle size of latex particles renders any significant formation of latex undesirable. The initiator is generally used in an amount ranging from about 0.01 percent up to about 10 percent by weight of the total polymerizable composition, preferably up to about 5 percent.

Aqueous suspensions of hollow microspheres which contain moderately ionized polar monomer(s) may also be prepared by a "one-step" emulsification process comprising aqueous suspension polymerization of at least one alkyl acrylate or alkyl methacrylate ester monomer and at least one moderately ionized polar monomer in the presence of at least one emulsifier capable of producing a water-in-oil emulsion inside the droplets which is substantially stable during emulsification and polymerization. As in the two-step emulsification process, the emulsifier is utilized in concentrations greater than its critical micelle concentration. In general, high HLB emulsifiers are required, i.e., emulsifiers having an HLB value of at least about 25, will produce stable cavity-containing droplets during the polymerization, and are suitable for use in this one-step process. Examples of such emulsifiers include alkylarylether sulfates such as sodium alkylarylether sulfate, e.g., Triton ™ W/30, available from Rohm and Haas, alkylarylpolyether sulfates such as alkylarylpoly(ethylene oxide) sulfates, preferably those having up to about 4 ethyleneoxy repeat units, and alkyl sulfates such as sodium lauryl sulfate, ammonium lauryl sulfate, triethanolamine lauryl sulfate, and sodium hexadecyl sulfate, alkyl ether sulfates such as ammonium lauryl ether sulfate, and alkylpolyether sulfates such as alkyl poly(ethylene oxide) sulfates, preferably those having up to about 4 ethyleneoxy units. Alkyl sulfates, alkyl ether sulfates, and alkylarylether sulfates are preferred as they provide a maximum void volume per microsphere for a minimum amount of surfactant. Polymeric stabilizers may also be present but are not necessary.

The composition may also contain a crosslinking agent such as a multifunctional (meth)acrylate, e.g., butanediol diacrylate or hexanediol diacrylate, or other multifunctional crosslinker such as divinylbenzene.

The hollow microspheres are normally tacky, elastomeric, insoluble but swellable in organic solvents, and small, typically having diameters of at least 1 micrometer, preferably in the range of about 1 to about 250 micrometers. The voids typically range in size up to about 100 micrometers or larger. The majority of the hollow microspheres contain at least one void with a void diameter which is at least about 10% of the diameter of the microsphere, preferably at least about 20%, more preferably, at least about 30%.

Following polymerization, an aqueous suspension of the hollow microspheres is obtained which is stable to agglomeration or coagulation under room temperature conditions. The suspension may have non-volatile solids contents of from about 10 to about 50 percent by weight. Upon prolonged standing, the suspension separates into two phases, one phase being aqueous and substantially free of polymer, the other phase being an aqueous suspension of microspheres having at least one cavity, which, upon drying, becomes a void. Both phases may contain a minor portion of small latex particles. Decantation of the microsphere-rich phase provides an aqueous suspension having a non-volatile solids content on the order of about 40-50 percent which, if shaken with water, will readily redisperse.

The aqueous suspension may be coagulated with polar organic solvents such as methanol, with ionic emulsifiers having a charge opposite to that of the emulsifier used in the polymerization process, or with saturated salt solutions, or the like, followed by washing and drying. The dried hollow microspheres, with sufficient agitation, will readily disperse in common organic liquids such as ethyl acetate, tetrahydrofuran, heptane, 2-butanone, benzene, cyclohexane, and esters, although it is not possible to resuspend them in water.

Binder copolymers useful in adhesives of the invention are copolymers having an inherent viscosity of at least about 0.4 dl/g. For aerosol applications, the preferred range is from about 0.4 to about 1.2 dl/g. The copolymers contain repeating units of A and C monomers, and B monomers. A is a monomeric acrylic or methacrylic acid ester of a non-tertiary alkyl alcohol having an average number of carbon atoms from about 4–12. B is a polar monomer copolymerizable with the monomeric acrylic acid ester. Preferred B monomers are acrylic acid, methacrylic acid, acrylamide, methacrylamide, and N-vinyl pyrrolidone. The B monomer(s) are present in amounts from about 1 part to about 20 parts. The C monomer has the general formula X-(Y)$_n$-Z wherein X is a vinyl group copolymerizable with the A and B monomers, Y is a divalent linking group wherein n can be either zero or one, and Z is a monovalent polymeric moiety having a T$_g$ greater than 20° C and a weight average molecular weight in the range of about 2,000 to 30,000 and being essentially unreactive under copolymerization conditions. The vinyl group of the C monomer and the A and B monomers are copolymerized to form an elastomeric backbone having the polymeric moieties pendant therefrom. The weight of the C monomer is within the range of about 1 to about 30% of the weight of all monomers. The total weight of the B and C monomers is from about 2% to about 50% of the weight of all monomers in the copolymer.

Monomer A, as previously mentioned, is a monomeric acrylic or methacrylic acid ester of a non-tertiary alcohol, said alcohol having from 1 to 14 carbon atoms with the average number of carbon atoms being about 4–12. Examples of such monomers include the esters of acrylic acid or methacrylic acid with non-tertiary alkyl alcohols such as 1-butanol, 1-pentanol, 2-pentanol, 3-pentanol, 2-methyl-1-butanol, 1-methyl-1-butanol, 1-methyl-1-pentanol, 2-methyl-1-pentanol, 3-methyl-1- pentanol, 2-ethyl-1-butanol, 3,5,5-trimethyl-1-hexanol, 3-heptanol, 2-octanol, 1-decanol, 1-dodecanol, isooctyl alcohol, isononyl alcohol, 2-ethyl-hexyl alcohol, and the like. Such monomeric acrylic or methacrylic esters are known in the art and many are commercially available.

As mentioned above, the B monomer is copolymerizable with the monomeric acrylic acid ester. Preferred B monomers are acrylic acid, methacrylic acid, itaconic acid, N-vinyl pyrrolidone, acrylamide, substituted acrylamides, e.g. n-octyl acrylamide, methacrylamide, acrylonitrile and methacrylonitrile. The B monomer comprises from about 1% up to about 20% of the total weight of all monomers. The preferred binder copolymer according to the present invention will contain from 1 to 15% by weight of B monomer.

The C monomer is a polymeric material having a copolymerizable vinyl moiety with which the A monomer and the B monomer will copolymerize under the polymerization conditions. The C monomer is represented by the general formula $X\text{-}(Y)_n\text{-}Z$ as described infra.

The preferred C monomer may be further defined as having an X group which has the general formula

wherein R is a hydrogen atom or a COOH group and R' is a hydrogen atom or methyl group. The double bond between the carbon atoms provides a copolymerizable moiety capable of copolymerizing with the A and B monomers.

The preferred C monomer includes a Z group which has the general formula

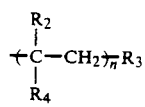

wherein $R_2$ is a hydrogen atom or a lower alkyl group, $R_3$ is a lower alkyl group, n is an integer from 20 to 500 and $R_4$ is a monovalent radical selected from the group consisting of

and $-CO_2R_6$ wherein $R_5$ is a hydrogen atom or a lower alkyl group and $R_6$ is a lower alkyl group. Preferably the C monomer has a general formula selected from the group consisting of

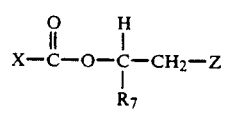

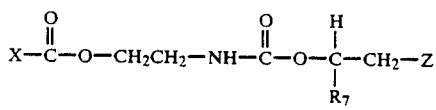

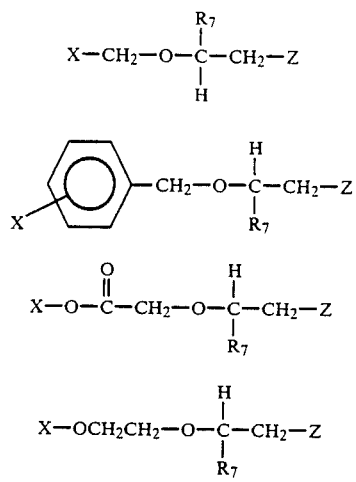

wherein $R_7$ is a hydrogen atom or a lower alkyl group.

The vinyl terminated polymeric monomers are sometimes known as macromolecular monomers or macromonomers. Such monomers are known and may be prepared by the method disclosed in U.S. Pat. Nos. 3,786,116, and 3,842,059, Milkovich et al., the disclosures of which are incorporated herein by reference.

The binder copolymer must have a relatively high cohesive strength in order for the final particulate adhesive to exhibit the full reduction in adhesive transfer. One conventional way to increase cohesive strength is to increase the molecular weight. However, for an aerosol adhesive to exhibit satisfactory spray deposition, dispersions must be within a specific rheological window. For a fixed quantity of microspheres (or particles), the rheological behavior is primarily controlled by amount of binder copolymer present, and its molecular weight. Molecular weights which are too high become difficult to spray, i.e., they exhibit stringing and cobwebbing, resulting in very nonuniform coatings, whereas excessively low molecular weight results in misting and overspray.

Another method of achieving high cohesive strength in polymers is to utilize crosslinking with high molecular weight polymers, which can be detrimental to aerosol sprayability. Surprisingly, the use of preferred amounts of a high cohesive strength binder copolymer containing both a polar monomer, and a high Tg macromonomer satisfies the cohesive strength requirements. Phase separation of the macromonomer enhances cohesive strength even in lower molecular weight materials. It is believed that this cohesive strength helps to bind the microspheres more firmly, thereby reducing transfer.

Compositions of the invention therefore exhibit decreased adhesive transfer for increased peel adhesion while retaining excellent sprayability.

The cohesive strength can be ascertained by Dynamic Mechanical Analysis of the macromonomer-containing binder copolymers to determine the shear storage modulus (G′). See, e.g., S.L. Rosen, *Fundamental Principles of Polymer Materials,* pg 259, Wiley-Interscience, 1982. The shear storage modulus represents the stored elastic energy when a polymer sample is stressed at a given strain rate. The binder copolymer should have a shear storage modulus of at least about $1.0\times10^5$ Pascals, preferably about $1.10\times10^5$ Pascals, most preferably about $1.20 \times 10^5$ Pascals, when measured at 3 Hz and 22° C.

The binder copolymer is prepared by free radical polymerization as described, e.g., in U.S. Pat. No. 4,554,234 (Husman et al.), or D. Satas *Handbook of PSA Technology*, 2nd Ed., p. 908, Van-Norstrand-Rheinhold, NY, 1989, incorporated herein by reference.

The particulate pressure-sensitive adhesive of the invention is made by combining a dispersion of hollow microspheres with a solution of the binder copolymer. Typically, binder copolymer is used at a ratio of about 1% to about 30%, based on the dry weight of the hollow microspheres. Preferred ranges are dependent on the inherent viscosity ("I.V.") of the binder copolymer selected. For aerosol applications, the preferred amount of binder copolymer is from about 10% to about 25% for binder copolymers having I.V.'s in the range of from 0.4 to 0.8 dl/g, and for those having I.V.,s in the range of 0.8 to 1.2 dl/g, the preferred range is from about 3% to about 15%.

Suitable backing materials for the solvent based coatings include paper, plastic films, cellulose acetate, ethyl cellulose, woven or nonwoven fabric formed of synthetic or natural materials, metal, metallized polymeric film, ceramic sheet material, and the like. Surprisingly, the use of compositions of the invention eliminates the necessity of priming the backing, even paper, prior to coating of the microspheres. Previously, such priming was necessary to achieve an acceptable level of adhesive transfer.

Where an aerosol spray adhesive is desirable, an aerosol premix is made by combining a dispersion of hollow microspheres in isohexane or the like, with from about 1% to about 30% binder copolymer based on the dry weight of the hollow microspheres. The binder polymer is typically added in a solvent. This premix is then added to an aerosol container and the container charged with a suitable propellant to give a final solids content of about 3%–15%.

Dispersions of the particulate adhesive in the organic liquid as described above, may be sprayed by conventional techniques without cobwebbing or may be incorporated in aerosol containers with suitable propellants such as Dymel TM, alkanes, alkenes, or chlorofluorocarbons, e.g., Freons TM, compressed gases, and the like. The repositionable pressure-sensitive adhesive of the invention provides a degree of peel adhesion which permits separation, repositioning, and rebonding, as well as excellent adhesive transfer characteristics.

Useful premix formulae have a solids content of from about 5% to about 20%, preferably from about 10% to about 16%.

Properties of the pressure-sensitive adhesives of the invention may be altered by addition of tackifying resin and/or plasticizer. Preferred tackifiers for use herein include hydrogenated rosin esters commercially available from companies such as Hercules Inc., under such trade names as Foral TM, and Pentalyn TM. Individual tackifiers include Foral TM 65, Foral TM 85, and Foral TM 105. Other useful tackifiers include those based on t-butyl styrene. Useful plasticizers include dioctyl phthalate, 2-ethyl hexyl phosphate, tricresyl phosphate, and the like.

It is also within the scope of this invention to include various other components, such as pigments, fillers, stabilizers, or various polymeric additives.

The pressure-sensitive adhesives of the invention have been found to show little microsphere transfer, thereby reducing or even eliminating the transfer problems disclosed by the prior art. These pressure-sensitive adhesives also provide excellent sprayability and greater peel adhesion for a given coating weight than do prior art repositionable pressure-sensitive adhesives which are solid microsphere-based.

Test Methods

The following tests have been used to evaluate compositions of the invention. All percentages, parts and ratios are by weight unless specifically stated otherwise.

Adhesive Coating Weight

A 2.54 cm. by 5.08 cm. piece of preweighed (W1) acetate film is taped to the edge of a piece of paper. Adhesive is sprayed in a steady and uniform manner across the paper and acetate film. The film is then dried first at 52° C for one hour followed by drying at room temperature (about 22° C) for one hour and reweighed (W2). The difference between the starting weight (W1) and the final weight (W2) is determined to be the adhesive coating weight for both substrates expressed in grams per 12.9 square centimeters.

Peel Adhesion

Peel adhesion is the force required to remove a coated flexible sheet material from a test panel measured at a specific angle and rate of removal. In the examples, this force is expressed in grams per centimeter (cm.) width of coated sheet. The procedure followed is:

A strip 1.27 cm. in width of the coated sheet is applied to the horizontal surface of a clean glass test plate with at least 12.7 lineal cm. in firm contact. A 2 kg. hard rubber roller is used to apply the strip. The free end of the coated strip is doubled back nearly touching itself so the angle of removal will be 180 degrees. The free end is attached to the adhesion tester load cell. The glass test plate is clamped in the jaws of a tensile testing machine which is capable of moving the plate away from the load cell at a constant rate of 2.3 meters per minute. The load cell reading in grams is recorded as the tape is peeled from the glass surface. The data is reported as the average of the range of numbers observed during the test in grams per centimeter width of strip.

Adhesive Transfer

"Adhesive transfer force" is that force necessary to cause a failure of the transferred adhesive. Therefore, a high value for this force is undesirable, as it would indicate a higher amount of adhesive had been transferred (therefore having higher adhesion). The lower the value, the lower the amount of adhesive transfer. This test is very sensitive at amounts of transfer up to about 25%; a small increase in adhesive transfer results in a relatively large increase in the force required to cause failure. After this level, a plateau of separation force is reached such that additional amounts of transfer result in smaller increases in the necessary force to cause failure of the adhesive.

In this test, coated sheet material was adhered to a marked area of 60–80 lb. clay-coated paper, a commercially available paper for the printing industry, for a few seconds using a mechanical rolling action provided by an IMASS Slip Peel Tester and then removed by hand at a 90 degree angle. A 3.2 cm. wide strip of polyethylene terephthalate polyester film was then adhered to the clay-coated paper by mechanical means (above) to provide a composite having a 20 cm. long overlap. The composite is removed from the Peel Tester and the claycoated paper end is clamped in the upper jaw of an Instron ™ tensile tester and the polyester film end is clamped in the lower jaw. Using a crosshead separation speed of 2.5 cm. per minute, the peak separation force for the sample is determined and reported as grams.

Inherent Viscosity Measurement

Inherent viscosity is measured by conventional means using a Cannon-Fenske #50 viscometer in a water bath controlled at 25° C to measure the flow time of 10 milliliters of a polymer solution (0.2 g. of polymer per deciliter of ethyl acetate). The inherent viscosity (I.V.) is reported as deciliter per gram (dl/g).

The following examples are illustrative in nature, and are not intended to limit the invention in any way. The scope of the invention is that defined by the claims only.

Preparation of the Hollow Microspheres

The hollow microspheres used in the examples were prepared by one of the following methods.

In a resin reactor equipped with mechanical stirrer, condenser, and inlet-outlet for vacuum and inert gases, 450 parts of deionized water, 141 parts of isooctyl acrylate, 9.0 parts of acrylic acid and 0.5 part of benzoyl peroxide were charged. Vacuum was applied to evacuate the reactor atmosphere, and the reactor was then purged with an inert gas (e.g., argon or nitrogen). The agitation was set to 400 RPM and when the initiator had dissolved, 1.5 parts of ammonium lauryl sulfate ("Standapol A", Henkel AG) were added. The temperature of the reactor was raised to 60° C and maintained at such temperature for 22 hours. An inert gas purge was maintained during the polymerization. After the 22 hour period, the suspension was allowed to cool to room temperature. The reactor was then emptied and the suspension filtered. Optical microscopy revealed hollow microspheres from about 4 to about 90 micrometers in diameter suspended in water. The majority of the microspheres contained a central cavity of at least 30% of the diameter of the microsphere. The microspheres were isolated by addition of a 0.3% aqueous solution of barium chloride, filtered and dispersed in acetone-isohexane.

Hollow microspheres were also made as described above, except that the polymerization temperature was 65° C, and the polymerization period was 7.5 hours, and the agitation speed of the agitator was 95 RPM.

Preparation of the Macromonomer-Containing Binder Copolymer

In a glass reaction bottle, 8 grams of a 10,000 molecular weight methacrylate-terminated polystyrene macromonomer was combined with the monomers listed in Table A, 300 grams of ethyl acetate, 0.6 grams of the initiator, Vazo ™ 64, and carbon tetrabromide dissolved in isooctyl acrylate. The percentages of carbon tetrabromide shown in Table A are based on the total amount of monomers (200g of monomers mixture). The bottle was then purged with nitrogen, sealed and tumbled in a water bath at 55° C for 24 hours.

TABLE A

| Macromonomer Containing Binder Copolymer | IOA g | ACM g | NVP g | AA g | NOACM g | CBr$_4$ % | I.V. |
|---|---|---|---|---|---|---|---|
| A | 184 | 8.0 | — | — | — | 0.020 | 1.02 |
| B | 184 | 8.0 | — | — | — | 0.050 | 0.76 |
| C | 184 | 8.0 | — | — | — | 0.090 | 0.61 |
| D | 184 | 8.0 | — | — | — | 0.125 | 0.50 |
| E | 184 | 8.0 | — | — | — | 0.175 | 0.40 |
| F | 184 | — | — | 8.0 | — | 0.075 | 0.57 |
| G | 162 | — | 30.0 | — | — | 0.075 | 0.58 |
| H | 172 | — | — | — | 20.0 | 0.075 | 0.55 |

IOA: isooctyl acrylate
ACM: acrylamide
NVP: N-vinyl pyrrolidone
AA: acrylic acid
NOACM: n-octyl acrylamide Dynamic Mechanical Thermal Analysis (DMTA)

Polymer specimens were prepared by solvent casting relatively thick films, ca. 2 mm in thickness, that were carefully air dried at room temperature for seven days, followed by 24 hour drying in vacuo. The shear storage modulus was then determined using a Polymer Laboratories DMTA Mark I, (Amherst Fields Research Park, Amherst, MA 01002) at 3 Hz and 22°. The data for a series of polymers is given in Table B below.

TABLE B

| Compositions | I.V. | G' (Pa × 10$^5$) | T(°C) |
|---|---|---|---|
| IOA/ACM/MAC$^{1,3}$ (92/4/4) | 0.61 | 1.205 | 23 |
| IOA/ACM/MAC$^2$ (92/4/4) | 1.02 | 1.253 | 22 |
| IOA/AA/MAC$^1$ (92/4/4) | 0.60 | 1.050 | 22 |
| IOA/NVP/MAC$^1$ (81/15/4) | 0.58 | 0.978 | 23 |
| IOA/NOACM/MAC$^1$ (81/10/4) | 0.55 | 0.529 | 22 |

$^1$Polystyrene macromonomer, MW = 10,000
$^2$Polysar macromonomer, C-4500
$^3$IOA, iso-octyl acrylate; ACM, acrylamide, AA, acrylic acid; NVP, N-vinyl pyrrolidone; NOACM, N-octylacrylamide

EXAMPLES

Comparative Examples 1C–4C

The comparative compositions were prepared by first dispersing the hollow microspheres in a solvent mixture of 60:40 by weight isohexane:acetone to yield a 12% dispersion of microspheres in the solvent to obtain an aerosol premix. This premix was then added to a 6 fluid ounce metal aerosol container fitted with the appropriate gaskets, valves, and a spray-button actuator, and the aerosol container was then charged with an isobutane propellant (A-31, isobutane having 31 psig at 70° F) to bring the total solids to 5–6%. Table 1 shows the peel adhesion and adhesive transfer force, along with the coating weights. The substrate used was standard white copier paper.

TABLE 1

| Example No. | Percent Copolymer | Adhesive Coating g/12.9 cm$^2$ | Peel Adhesion g/cm | Adhesive Transfer Force g |
|---|---|---|---|---|
| 1C | 0 | 0.002 | 9.13 | 7,200 |
| 2C | 0 | 0.003 | 17.01 | 7,371 |
| 3C | 0 | 0.004 | 31.18 | 8,023 |

TABLE 1-continued

| Example No. | Percent Copolymer | Adhesive Coating g/12.9 cm² | Peel Adhesion g/cm | Adhesive Transfer Force g |
|---|---|---|---|---|
| 4C | 0 | 0.005 | 32.44 | 8,108 |

Examples 1-12

These examples illustrate the effect of the composition of the macromonomer-containing binder copolymer on adhesive transfer.

The compositions were prepared by first dispersing the hollow microspheres in a solvent mixture of 60:40 by weight isohexane:acetone to yield a 12% dispersion of microspheres in the solvent. An ethyl acetate solution of the macromonomer-containing binder copolymer with the composition and I.V. described in Table A was prepared and added to the microsphere dispersion to obtain an aerosol premix. This premix was then added to a six-fluid ounce metal aerosol container fitted with the appropriate gaskets, valves, and a spray-button actuator, and the aerosol container was then charged with an isobutane propellant (A-31, isobutane having 31 psig at 70° F.) to bring the total solids to 5-6%. The amounts of macromonomer-containing binder copolymer based on dry weight of hollow microspheres, the peel adhesion and the adhesive transfer force are shown in Table 2. The substrate used was standard white copier paper. The coating weight for the samples is about 0.005g/12.9cm².

TABLE 2

| Example No. | I.V. | % by Wt Copolymer | Peel Adhesion g./cm. | Adhesive Transfer Force (g). |
|---|---|---|---|---|
| Macromonomer-Containing Binder Copolymer C | | | | |
| 1 | 0.61 | 15 | 37.48 | 3,643 |
| 2 | 0.61 | 20 | 36.54 | 1,956 |
| 3 | 0.61 | 25 | 40.16 | 1,389 |
| Macromonomer-Containing Binder Copolymer F | | | | |
| 4 | 0.57 | 15 | 22.20 | 3,912 |
| 5 | 0.57 | 20 | 25.35 | 3,061 |
| 6 | 0.57 | 25 | 28.03 | 3,940 |
| Macromonomer-Containing Binder Copolymer G | | | | |
| 7 | 0.58 | 15 | 22.05 | 4,493 |
| 8 | 0.58 | 20 | 27.72 | 5,301 |
| 9 | 0.58 | 25 | 29.13 | 4,777 |
| Macromonomer-Containing Binder Copolymer H | | | | |
| 10 | 0.55 | 15 | 24.25 | 3,289 |
| 11 | 0.55 | 20 | 24.36 | 4,772 |
| 12 | 0.55 | 25 | 29.40 | 3,875 |

As can be seen from the above table, compositions of the invention, i.e., those including a macromonomer-containing binder copolymer show dramatically reduced force required to cause the transferred adhesive to fail. This indicates that the amount of transferred adhesive for compositions of the invention is reduced by an equally sizable percentage.

Examples 13-17

The compositions were prepared as described in Examples 1-12, except that various types of macromonomer-containing binder copolymer were used. Table 3 shows the adhesive transfer force as a function of the I.V. of the macromonomer-containing binder copolymer, and amount of macromonomer-containing binder copolymer. Again, the substrate was standard white copier paper.

TABLE 3

| | | Adhesive Transfer Force (g). | | | | |
|---|---|---|---|---|---|---|
| Example No. | Type (I.V.) | % Macromonomer-Containing Binder Copolymer | | | | |
| | | 5% | 10% | 15% | 20% | 25% |
| 13 | A (1.02) | 3,955 | 1,942 | 1,516 | — | — |
| 14 | B (0.76) | — | 2,963 | 2,112 | 1,871 | — |
| 15 | C (0.61) | — | — | 3,643 | 1,956 | 1,389 |
| 16 | D (0.50) | — | — | 3,579 | 2,679 | 3,416 |
| 17 | E (0.40) | — | — | 2,750 | 4,479 | 2,126 |

Examples 18-22

The compositions were prepared as described in Examples 1-12, except that Macromonomer-Containing Binder Copolymer C, having an I.V. of 0.61 was used. Table 4 shows the adhesive transfer force for a variety of coating weights. The substrate used was standard white copier paper.

TABLE 4

| Example No. | Percent Binder Copolymer | Adhesive Coating g/12.9 cm² | Peel Adhesion g/cm | Adhesive Transfer Force (g.) |
|---|---|---|---|---|
| 18 | 20 | 0.0030 | 19.69 | 1,049 |
| 19 | 20 | 0.0037 | 30.71 | 1,276 |
| 20 | 20 | 0.0055 | 39.69 | 468 |
| 21 | 20 | 0.0063 | 50.08 | 680 |
| 22 | 20 | 0.0098 | 66.93 | 71 |

Examples 23-35

In these examples, peel adhesion and adhesive transfer force were measured from a variety of conventional substrates, including assorted types of papers and films. The substrate was sprayed with an aerosol composition similar to that described in Examples 18-22. The results are shown in Table 5.

TABLE 5

| Example No. | Substrate | Peel Adhesion g/cm | Adhesive Transfer Force g. |
|---|---|---|---|
| 23 | Magazine | 64.02 | 3,856 |
| 24 | Photo Layout | 58.11 | 2,367 |
| 25 | Vellum | 38.66 | 1,262 |
| 26 | Foil | 53.86 | 872 |
| 27 | Parchment | 22.99 | 1,233 |
| 28 | Construction | 20.71 | 872 |
| 29 | Tracing paper | 34.02 | 1,914 |
| 30 | Art Kraft | 26.14 | 496 |
| 31 | Lindsey layout bond | 6.54 | 291 |
| 32 | Crepe Paper | 2.52 | 269 |
| 33 | Wrapping Paper | 25.04 | 191 |
| 34 | Litho Mask | 70.87 | 142 |
| 35 | Exposed Litho Film | 70.87 | 2,055 |

What is claimed is:

1. A repositionable pressure-sensitive adhesive comprising from about 70% to about 99% of:
   (a) hollow, polymeric, acrylate, inherently tacky, infusible, solvent-insoluble, solvent-dispersible, elastomeric microspheres comprising at least one alkyl acrylate or alkyl methacrylate ester, a majority of the microspheres having one or more interior voids having a diameter of at least about 10% of the diameter of the microsphere; and
   (b) correspondingly, from about 30% to about 1% of a binder copolymer comprising an elastomeric polymeric backbone having pendant therefrom polymeric moieties, said backbone containing repeating A and C monomers and from about 1% to about 20% B monomers, wherein A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;

B is a polar monomer copolymerizable with said monomeric acrylic acid ester;

C is a monomer having the general formula X-(Y)$_n$-Z, wherein X is a vinyl group copolymerizable with said A and B monomers, Y is a divalent linking group, where n is zero or 1, and Z is a monovalent polymeric moiety having a T$_g$ greater than 20° C, and a molecular weight in the range of about 2,000 to about 30,000, and being essentially unreactive under copolymerization conditions, C comprising from about 1% to about 30% of said monomers, wherein said binder copolymer has a shear storage modulus of at least about $1 \times 10^5$ Pascals at 3 Hz, and 22° C.

2. A repositionable pressure-sensitive adhesive according to claim 1 wherein said microspheres further comprise at least one polar monomer.

3. A repositionable pressure-sensitive adhesive comprising from about 70% to about 99% of:

(a) hollow, polymeric, acrylate, inherently tacky, infusible, solvent-insoluble, solvent-dispersible, elastomeric microspheres comprising
  (i) at least about 85 parts by weight of at least one alkyl acrylate or alkyl methacrylate ester; and
  (ii) up to about 15 parts by weight of at least one polar monomer, a majority of the microspheres having one or more interior voids having a diameter of at least about 30% of the diameter of the microsphere, and (b) correspondingly, from about 30% to about 1% of a binder copolymer comprising an elastomeric polymeric backbone having pendant therefrom polymeric moieties, said backbone containing repeating A and C monomers and from about 1% to about 20% B monomers, wherein A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;

B is a polar monomer copolymerizable with said monomeric acrylic acid ester;

C is a monomer having the general formula X-(Y)$_n$-Z, wherein X is a vinyl group copolymerizable with said A and B monomers, Y is a divalent linking group, where n is zero or 1, and Z is a monovalent polymeric moiety having a T$_g$ greater than 20° C, and a molecular weight in the range of about 2,000 to about 30,000, and being essentially unreactive under copolymerization conditions, C comprising from about 1% to about 30% of said monomers, wherein said binder copolymer has a shear storage modulus of at least about $1 \times 10^5$ Pascals at 3 Hz and 22° C.

4. A repositionable pressure-sensitive adhesive according to claim 1 wherein said binder copolymer has a shear storage modulus of at least about $1.1 \times 10^5$ Pascals at 3 Hz and 22° C.

5. A repositionable pressure-sensitive adhesive according to claim 1 wherein said monomer B in said binder copolymer is selected from the group consisting of acrylic acid, methacrylic acid, itaconic acid, N-vinyl pyrrolidone, acrylamide, methacrylamide, acrylonitrile and methacrylonitrile.

6. A repositionable pressure-sensitive adhesive according to claim 1 wherein said binder copolymer has an inherent viscosity in the range of from 0.4 to 0.8 dl/g, and comprises from about 10% to about 25% of said adhesive.

7. A repositionable pressure-sensitive adhesive according to claim 1 wherein said binder copolymer has an inherent viscosity in the range of from 0.8 to 1.2 dl/g, and comprises from about 3% to about 15% of said adhesive.

8. A repositionable spray pressure-sensitive adhesive comprising a composition according to claim 1 and further comprising a propellant selected from the group consisting of alkanes, alkenes, chlorofluorocarbons, and compressed gases.

9. A repositionable spray pressure-sensitive adhesive according to claim 8 having a solids content of from about 3% to about 15%.

10. A repositionable spray pressure-sensitive adhesive according to claim 9 having a solids content of from about 4 to about 8%.

11. An organic dispersion comprising an organic carrier liquid and (a) hollow, polymeric, acrylate, inherently tacky, infusible, solvent-insoluble, solvent-dispersible, elastomeric microspheres comprising at least one alkyl acrylate or alkyl methacrylate ester, a majority of the microspheres having one or more interior voids having a diameter of at least about 10% of the diameter of the microsphere; and (b) a binder copolymer comprising an elastomeric polymeric backbone having pendant therefrom polymeric moieties, said backbone containing repeating A and C monomers and from about 1% to about 20% B monomers, wherein A is a monomeric acrylic or methacrylic acid ester of a non-tertiary alcohol, said alcohol having from 1 to 14 carbon atoms, with the average number of carbon atoms being about 4–12, said A monomer comprising from about 50% to about 98% of said monomers;

B is a polar monomer copolymerizable with said monomeric acrylic acid ester;

C is a monomer having the general formula X-(Y)$_n$-Z, wherein X is a vinyl group copolymerizable with said A and B monomers, Y is a divalent linking group, where n is zero or 1, and Z is a monovalent polymeric moiety having a T$_g$ greater than 20° C, and a molecular weight in the range of about 2,000 to about 30,000, and being essentially unreactive under copolymerization conditions, C comprising from about 1% to about 30% of said monomers, wherein said binder copolymer has a shear storage modulus of at least about $1 \times 10^5$ Pascals at 3 Hz and 22° C.

12. A sheet material having coated on at least a portion thereof the organic dispersion of claim 11.

13. A sheet material coated with the repositionable pressure-sensitive adhesive of claim 1.

14. A repositionable pressure-sensitive adhesive comprising the organic dispersion of claim 11.

15. A repositionable pressure-sensitive adhesive according to claim 1 wherein said hollow, polymeric, acrylate, inherently tacky, infusible, solvent-insoluble, solvent-dispersible, elastomeric adhesive microspheres comprise:

(a) at least about 85 parts by weight of at least one alkyl acrylate ester selected from the group consisting of isooctyl acrylate, 2-ethylhexyl acrylate, isononyl acrylate, isoamyl acrylate, isodecyl acrylate and n-butyl acrylate, and (b) correspondingly, up to about 15 parts by weight of at least one polar monomer selected from the group consisting of acrylic acid, methacrylic acid, itaconic acid, crotonic acid, maleic acid, fumaric acid, and salts thereof.

16. A repositionable pressure-sensitive adhesive according to claim 15 wherein said alkyl acrylate is isooctyl acrylate, and said polar monomer is acrylic acid.

* * * * *

UNITED STATES PATENT AND TRADEMARK OFFICE
CERTIFICATE OF CORRECTION

PATENT NO. : 4,994,322

DATED : February 19, 1991

INVENTOR(S) : Joaquin Delgado, Roger W. Leinen and Spencer F. Silver

It is certified that error appears in the above-identified patent and that said Letters Patent is hereby corrected as shown below:

Col. 5, line 49, underline infra.

Col. 6, line 16, "watersoluble" should read --water-soluble--.

Col. 9, line 22, underline infra.

Col. 13, line 66, "monomers" (second occurrence) should read --monomer--.

Col. 14, line 24, underline in vacuo.

Signed and Sealed this

Sixth Day of April, 1993

Attest:

STEPHEN G. KUNIN

Attesting Officer

Acting Commissioner of Patents and Trademarks